United States Patent Office 3,105,678
Patented Oct. 1, 1963

3,105,678
DEVICE FOR PREHEATING AND PREPARING FOR MOLDING THERMOPLASTIC SYNTHETIC MATERIALS
Jan Christoffel van Houten, Baarn, Netherlands, assignor to North American Philips Company, Inc., New York, N.Y., a corporation of Delaware
Filed Mar. 29, 1960, Ser. No. 18,391
Claims priority, application Netherlands Apr. 14, 1959
3 Claims. (Cl. 263—7)

It is known to preheat thermoplastic synthetic materials and more particularly polyvinylchloride acetate intended for pressing phonograph records, this preheating being effected by blowing a heated gas through a proportioned amount of synthetic material. However, devices of known type are not particularly suitable for use in mass production, more particularly with phonograph records, while known devices also have the drawback that the heated gas blows simultaneously through a number of containers filled with synthetic material so that any impurities present in one, dispersing these as grains of sand, are dispersed. However, such impurities may have a greater deteriorating effect upon the phonograph mold or matrices.

A device according to the invention is particularly suited for use in series- or mass production and is characterized in that it comprises a circular table positioned horizontally and rotating periodically in a horizontal plane and driven preferably electrically. This table can occupy an even number of positions regularly distributed over its circumference when stopped, while the table top is provided with as many recesses regularly distributed over the circumference as there are positions, and in at least one position the gas heated and supplied by a stationary device is blown through the material present in a recess.

In one embodiment of the invention, the preheated gas vertically flows through the substance in one position of the table, whereas in one of the subsequent positions the preheated gas is blown through the substance in opposite direction. It is thus ensured that the substance is heated as evenly as possible. An even lower temperature gradient in the substance is obtained if, in another embodiment of the invention, the table possesses six positions and six recesses and the angle made by the two positions in which the substance is heated is 120°, while between these positions there is another position in which heat is not supplied to the material.

In a further embodiment of the invention, in order to ensure a smooth working process, a stationary proportioning device is provided which, in one position of the table, fills one recess with an amount of material, whereas in a position which, as measured in the direction of movement of the table, lies 240° farther, an expelling device is present which is moved preferably pneumatically and which removes the heated material from the recess, if desired together with a perforated carrier plate located on the base of the recess.

It is known to design a blower so that the gas to be heated blows along a body which is preferably heated electrically. In one embodiment of the invention, such a known blower is designed so that it can deliver at the same time a heated flow of gas controllable, as regards the quantity, from above the table in downward direction and a controllable heated flow of gas in the reverse sense. In this case, one blower suffices, which enhances the simplicity of the device.

It is usually desirable for the labels with which phonograph records are provided to be likewise preheated. This is important, since paper is in most cases highly hygroscopic and, during pressing, the vapour liberated from the paper is liable to damage the label. In one embodiment of the invention, the table also comprises recesses for receiving the labels required in the manufacture of phonograph records, while in another embodiment the labels are likewise preheated in one or more of such recesses. In again another embodiment of the invention, it is then preferable to provide the table with three recesses each of which can accommodate, radially side by side, two stacks of labels contained, if desired, in cassettes, which recesses are located in regular distribution between the recesses for the material to be heated.

As a rule, it is desirable for the labels to be heated to a less high temperature than the substance. In one embodiment of the invention, for this purpose, means are provided for decreasing the amount of heated gas when the labels are in the position in which they are heated. In a further embodiment of the invention, such means may comprise a shut-off valve having two positions and arranged in each supply tube for the heated gas and moved preferably pneumatically. The valve in each supply tube in one position allows a free supply of the gas, while in the other position small apertures are placed in operation when the valve is closed to restrict the supply tube, which permits only a small flow of gas through this tube.

In a further embodiment of the invention, the outlet end of the supply tube for the heated gas is provided with a connecting piece which can preferably be moved pneumatically and which is lifted, during the movement of the table, and with the table at a standstill engages the table in a gas-tight connection between the tube and the upper or lower edge of the table overlying a recess thereof. It is thus ensured that the heated gas actually blows through the material to be heated or through the labels.

In again another embodiment of the invention, the table rotates in a stationary box-like body which is provided with an aperture at each position of the table, except the position between the two heating positions, and to which the inlet and outlet ends of the tubes for the heated gas, together with the expelling device, the proportioning device and, if desired, a mechanism for lifting the labels, are rigidly connected.

In order that shocks upon starting the table, due to which grains of synthetic material might sweep out of the recesses, may be avoided as much as possible, in one embodiment of the invention the table is driven by means of an electric motor having as many poles, each separately energizable, as there are recesses.

In order that the invention may be readily carried into effect, one embodiment thereof will now be described in detail, by way of example, with reference to the accompanying drawings, in which.

Figure 1:
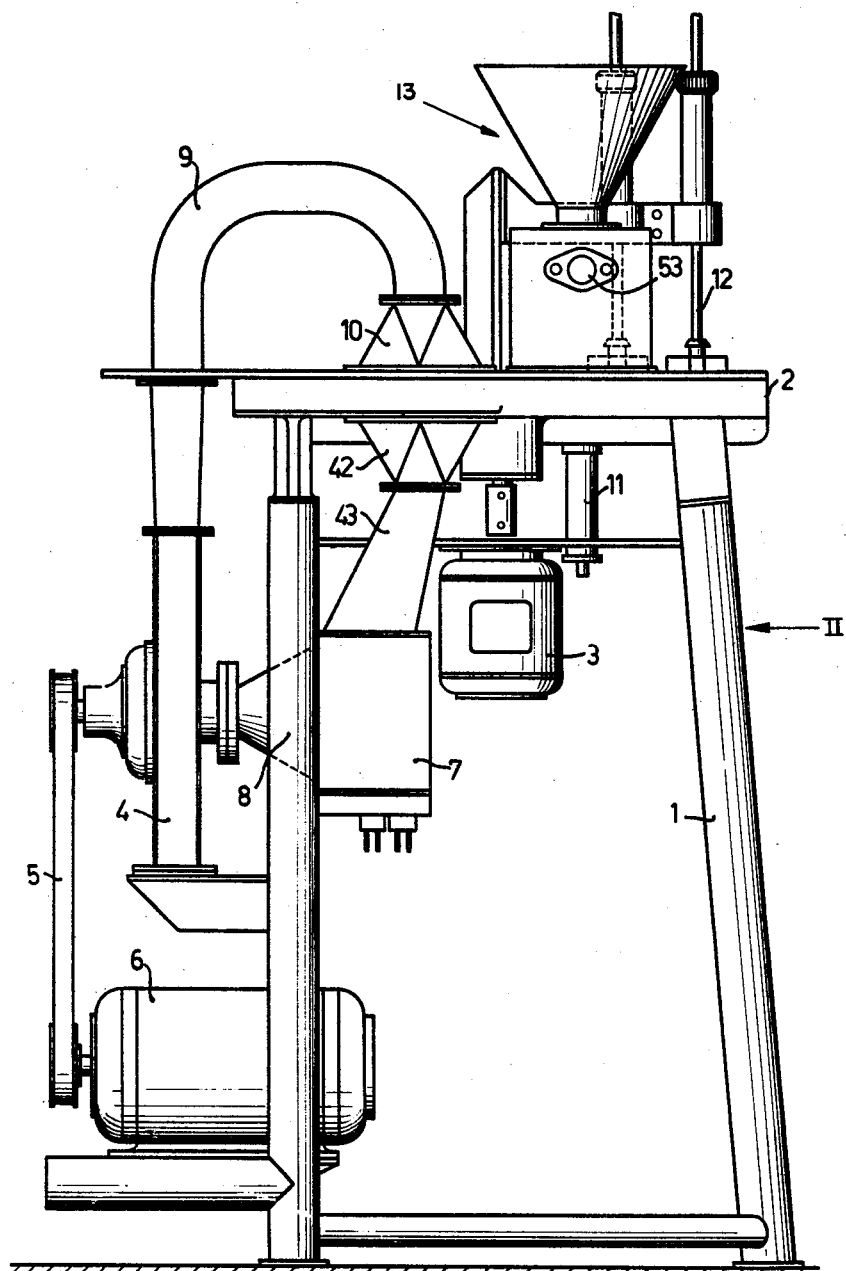
FIG. 1 is an elevation view of a rotary heating table for preheating and preparing for moulding polyvinylchloride acetate in the granular state, and also for preheating labels.
Figure 2:
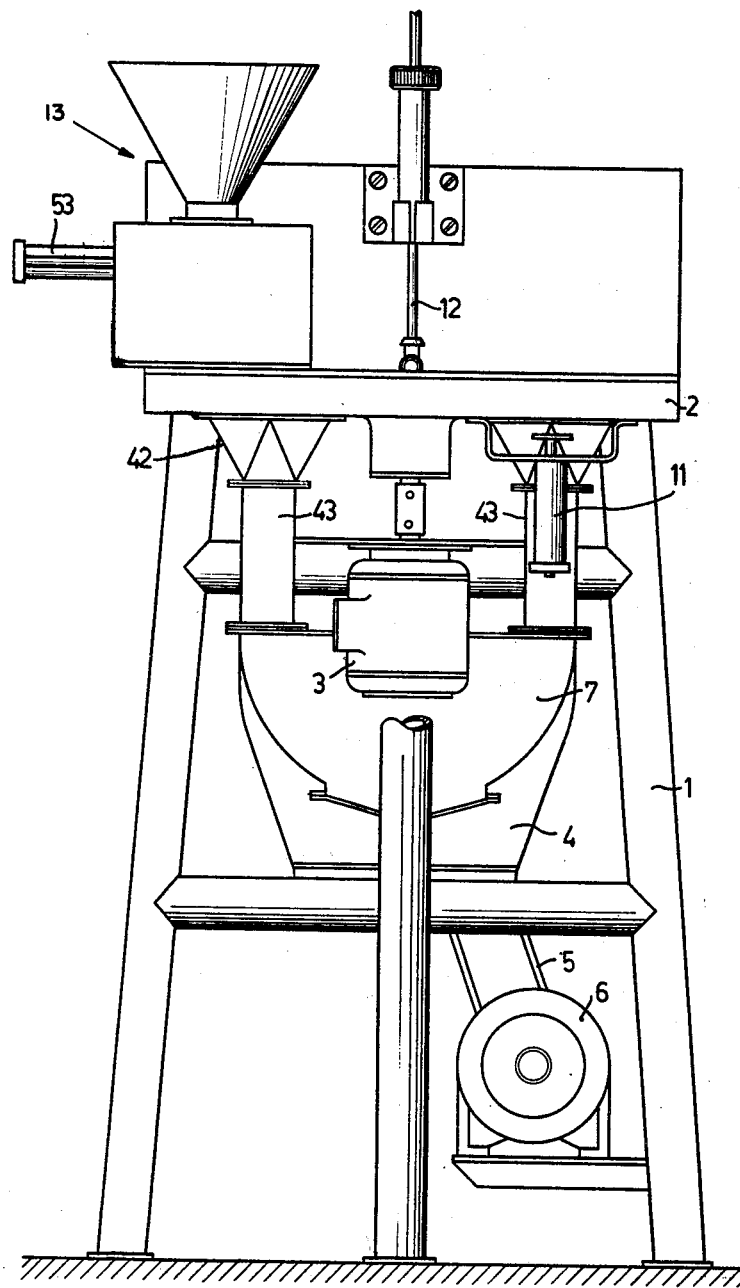
FIG. 2 is an elevation view of this rotary table, as viewed in the direction of the arrow.
Figure 3:
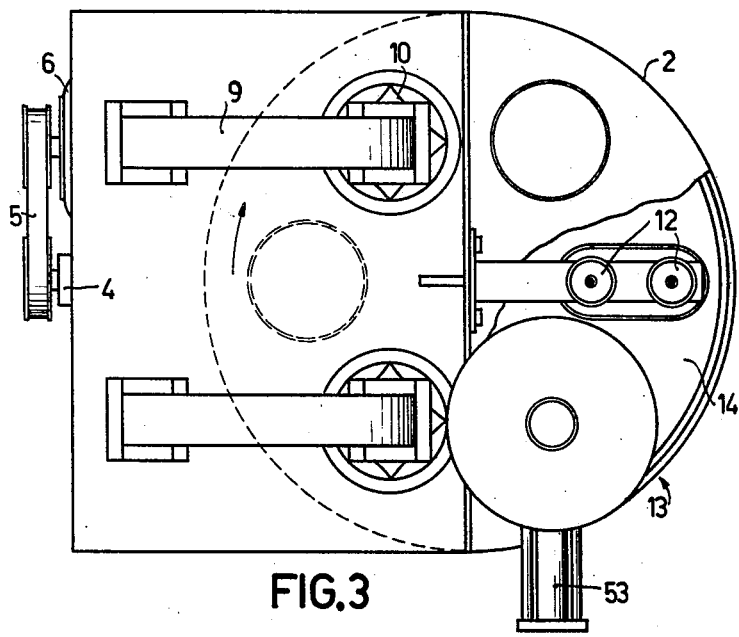
FIG. 3 is a plan view of the rotary table.

With reference to FIGS. 1, 2 and 3, the general structure of the device will first be explained. Mounted on a frame 1 manufactured from steel tube is a box-like body 2 in which a rotary table 14 can rotate. The rotary table 14 is driven by means of a six-poler electric motor 3. A fan 4 is driven via a belt 5 by means of an electric motor 6. The air circulated by the fan 4 first passes through an electric heating element 7, enters the fan body after having passed a regulating valve 8 and is subsequently blown through pipes 9 via a connecting piece 10 through recesses present in the table, whereupon the air after passing through a filter again enters the heater body 7. Consequently, there is a closed circuit. Two sets of pipes 9 and connecting pieces 10 are provided. An expelling device 11 is fixedly mounted under the box-like body 2 and on the box there are arranged two label lifting devices 12, together with a known hopper and proportioning device generally designated 13.

Figure 4:
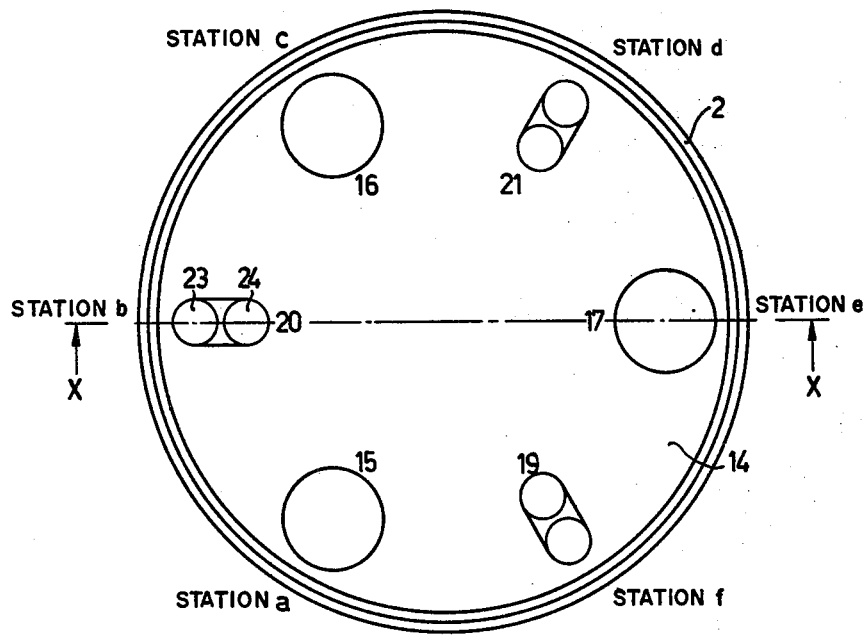
FIG. 4 shows diagrammatically a plan view of the rotary table.
Figure 5:
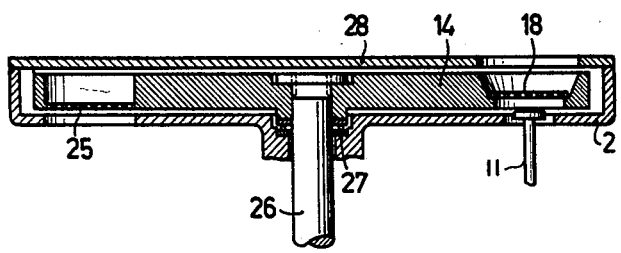
FIG. 5 is a sectional view of the table, taken along the line X—X.

With reference to FIGS. 4 and 5, the table 14 which rotates in the box-like body 2 will now first be described. The table 14 has six recesses or apertures regularly distributed over its circumferences. Of these apertures, those indicated by 15, 16 and 17 are intended, for example, to receive polyvinylchloride acetate in the granular state; each of them is closed at the bottom by means of a perforated steel plate 18 which lies loose in the recess. The apertures 19, 20 and 21 have a shape such that each of them can accommodate two cassettes containing stacks of labels 23 and 24. The labels 23 lie in the cassette with the printed side above, whereas the labels 24 lie with the printed side below. The base 25 of each of the recesses 19, 20 and 21 is rigidly connected to or integral with the table 14 and also perforated. The table is driven by means of a shaft 26 and bears on a ball bearing 27. In FIG. 4, the cover 28 of the box is omitted for the sake of clarity. The six positions or stations of the table are indicated by the reference characters $a$, $b$, $c$, $d$, $e$ and $f$ in FIG. 4. It is assumed that each of the recesses 15 and 16 is filled with an amount of polyvinylchloride acetate in the granular state and that at position $d$, under the box, the expelling device 11 is present, and at position $e$, on the cover, the label lifting device 12 and at position $f$, on the cover, the proportioning device 13. Furthermore there are on the cover, in the positions $a$ and $c$, valves 10 and pipes 9. In the position shown, the polyvinylchloride is heated at station $a$ and at station $c$. Nothing happens in the recess 17 at position $e$, this recess being empty. In the next position in which recess 17 is in position $f$ and the other recesses are in corresponding positions, the recess 17 is filled with a given amount of grains by means of the proportioning device 13 present on the cover. The recess 19 containing the cassettes with labels is heated in position $a$, whilst the amount of synthetic material located in recess 15 and now heated rests in position $b$, so that the temperature gradient in the synthetic material becomes lower. The recess 20 is now in position $c$ in which the labels are again heated, the material of recess 16, which is now thoroughly heated, being removed in position $d$. Two labels are removed from recess 21 in position $e$. These manipulations are repeated when the rotation of the table continues. A recess for the synthetic material thus traverses the following positions: filling, heating, resting, heating, removal, and a position in which nothing happens. A recess for labels traverses the following positions: heating, resting, heating, resting, lifting, resting. The table is provided with an arresting device in known manner (not shown). The electric motor 3 has six poles which are energized separately, since upon starting the motor there must be no shocks in the rotation of the table, since otherwise a number of grains may sweep out of the recesses. The table must also be stopped without shocks. When the motor is stopped, it rotates beyond the stations and then slowly returns until the ratchet of the arresting device becomes operative.

Figure 6:
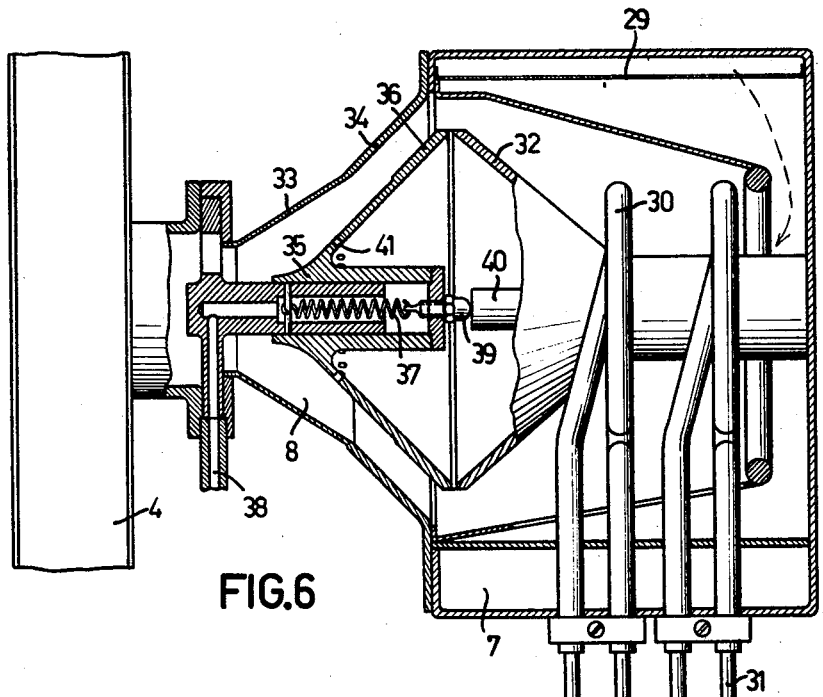
FIG. 6 is a sectional view of a heating element with its associated regulating valve for the regulation of the flow of heated gas.

FIG. 6 is a sectional view of the device 7 for heating the air and of the regulating valve 8. The box-like body 7 contains a filter 29 through which the air enters the interior of the heating chamber in a direction indicated by the dotted arrow. The heating chamber contains two heater bodies 30 which are insulated and electrically heated, plugs 31 being connected to their ends. The heating chamber also contains a fixedly-arranged conical body 32 around which the air flows. A connection cone 33 is provided with a valve seat 34. Inside the connection cone 33 is a movable valve 35, a sealing edge 36 of which can engage the seat 34, thus preventing admittance of the heated flow of air to the connection cone 33. The valve 35 is urged against the seat 34 by means of a spring 37. However, if air under pressure is admitted to the duct 38, the valve 35 is pushed, against the action of spring 37, to the right until a stop 39 abuts a fixed pin 40. Much less hot air is required for heating the labels. The valve 35 is then wholly moved to the left so that the sealing edge 36 bears on the seat 34. However, a number of orifices 41 are provided in the valve so that an amount of air still circulates which is sufficient for heating the labels. This has the additional advantage that the temperature of the heater elements 30 is not unduly raised.

At the lower side of the table housing or box 2 is a receiving cone 42 (see FIG. 1) through which the air, after having given off heat to the moulding material or the labels, again enters the heating space via a duct 43 and the filter 29.

Figure 7:
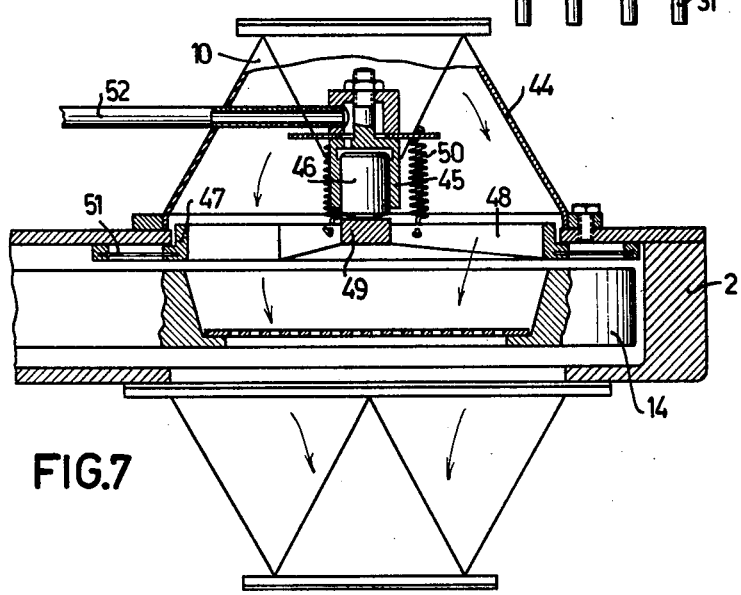
FIG. 7 is a sectional view of a junction piece for connecting a supply tube for the heated gas to the rotary table.

The junction piece 10 for connecting the supply tube 9 to the upper side of the box 2 is shown in FIG. 7. A conical body 44 is rigidly secured to the upper side of the box 2. A cylinder 45, in which a pressure piston 46 can move, is fixedly arranged in the conical body 44. An annular body 47 is connected by means of a number of spokes 48 to a central part 49 which is urged against the piston 46 by means of a pull spring 50. The ring 47 is connected by means of an elastic annular disc 51 to the cover of the box 2. If air under pressure is admitted to a duct 52, the piston 46 moves downwards and the ring 47 presses on the edge of the table 14 around a recess so that the air is blown only through the corresponding recess or cassettes.

The expelling device 11 for the moulding powder or granules comprises a simple lifting cylinder which operates pneumatically. Any known suitable device 12 may be used for catching and lifting the labels. The proportioning device 13 possesses a valve (not shown) which is moved by means of a pneumatic piston with cylinder 53.

It will be evident that the operation of the device may be completely automated insofar as the heating of synthetic material and the heating and lifting of labels is concerned. The current supply to the electric motor of the rotary table and the operation of the various cocks admitting air under pressure to the ducts can be regulated by means of relays which in themselves may be operated by means of a rotary collector or switching drum which may be moved electrically.

The device described has the additional advantage that, if suddenly stagnation occurs in the process of manufacturing the phonograph record proper or other moulded article, at the most three comparatively small quantities of raw material are lost due to the fact that they remain unduly long at a comparatively high temperature without being worked further and thus dissociate. In an oven of known type in which a large number of portions is slowly heated by a flow of hot air, in such a case even fifty or more portions of raw material are lost. In the embodiment shown, the number of complete revolutions of the table was 1 per minute. The time which elapsed between the filling of a recess and removal of the preheated portion of substance thus was 40 seconds. The heating proper of each portion lasted 20 seconds, in contradistinction to the known method wherein this period is 20 minutes.

Although the drawings show an embodiment wherein in the two heating positions the air flows from above in a downward direction, the device can be modified by means of a simple variation so that, in one position, the heated air flows from below in the upward direction. This sometimes affords advantages in view of uniform heating of the synthetic material.

Putting the labels in cassettes and positioning such cassettes in the depressions intended therefor affords the advantage that the working process need not be interrupted for this positioning.

What is claimed is:

1. A device for heating thermoplastic molding materials comprising a substantially circular table positioned substantially horizontally and rotatable in a horizontal plane, means for periodically rotating and stopping said table at a predetermined number of positions, said table being provided with regularly distributed recesses having perforated bottom walls corresponding to the number of positions of said table, said recesses being adapted to hold said thermoplastic material, housing means enclosing said table having closed circuit air ducts operatively associated therewith and openings therein at determined positions of said table, and means at least at one said position for propelling a heated gas through a corresponding said recess, and means for controlling the quantity of said hot gases circulating through said closed circuit ducts.

2. A device as claimed in claim 1 wherein said table has six positions, six recesses, and two heat applying positions, the angles made by the two positions in which the material is heated being 120° while between said positions there is another position in which heat is not supplied to the recess at said other position.

3. A device as claimed in claim 1 further comprising a supply tube for conducting said heated gas to said recesses, the outlet end of said supply tube being provided with a movable connection piece, means for lifting said connection piece upon the rotation of said table, and means for moving said connection piece to effect a gastight connection between said supply tube and said table.

References Cited in the file of this patent

UNITED STATES PATENTS

| | | |
|---|---|---|
| 1,506,149 | Beadle | Aug. 26, 1924 |
| 1,520,214 | Thomson | Dec. 23, 1924 |
| 1,786,714 | Greenawalt | Dec. 30, 1930 |
| 1,846,999 | Eaton | Feb. 23, 1932 |
| 2,114,545 | Slayter | Apr. 19, 1938 |
| 2,228,614 | Soubier et al. | Jan. 14, 1941 |
| 2,743,478 | Harlow et al. | May 1, 1956 |
| 2,828,508 | Labarre | Apr. 1, 1958 |
| 2,851,620 | Hausen | Sept. 9, 1958 |
| 2,893,057 | Rekettye | July 7, 1959 |
| 2,907,072 | Jodell | Oct. 6, 1959 |
| 2,927,782 | Paton | Mar. 8, 1960 |
| 2,975,470 | Snelson et al. | Mar. 21, 1961 |

FOREIGN PATENTS

| | | |
|---|---|---|
| 1,041,241 | Germany | Oct. 16, 1958 |

OTHER REFERENCES

Modern Plastics, June 1946, pp. 148–50.